Sept. 16, 1969    W. A. FEUERER    3,467,351
ANCHORING DEVICE
Filed May 3, 1967
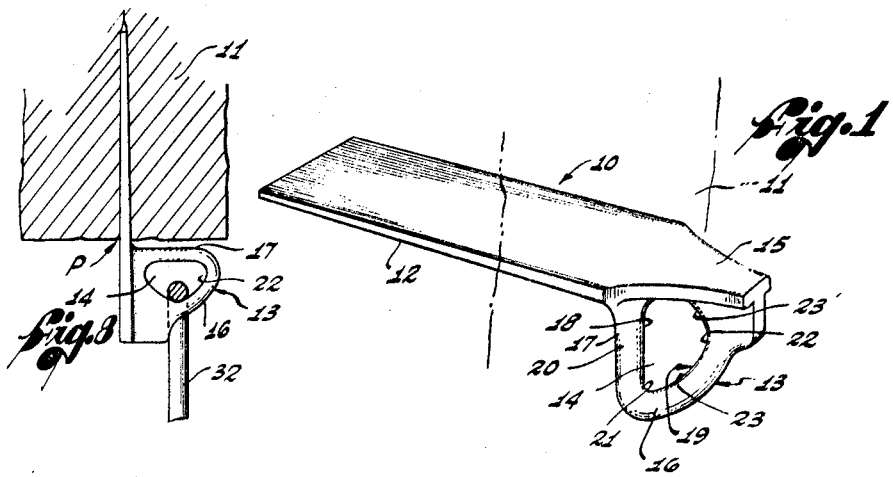
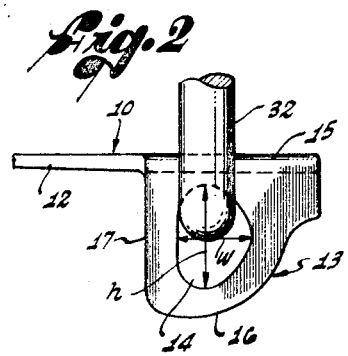
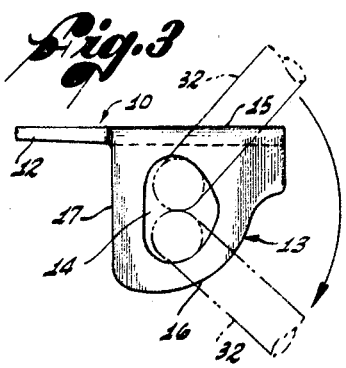
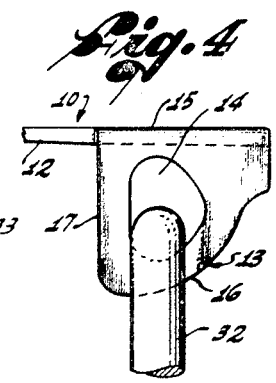
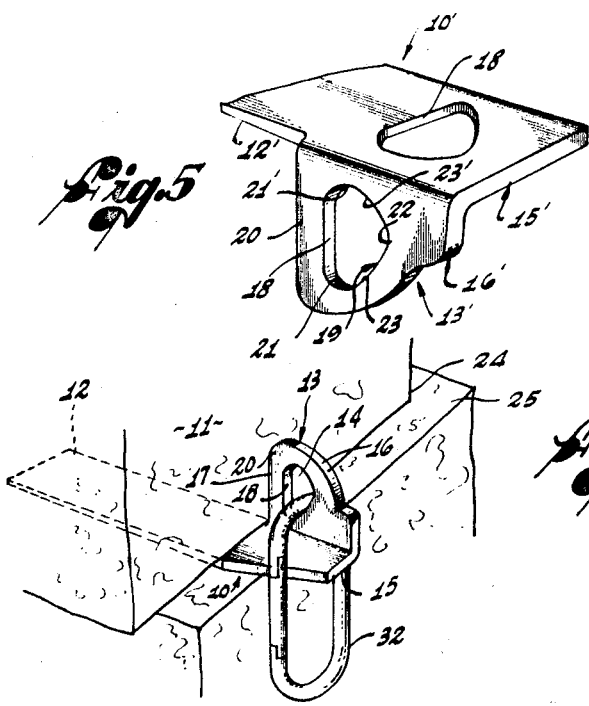
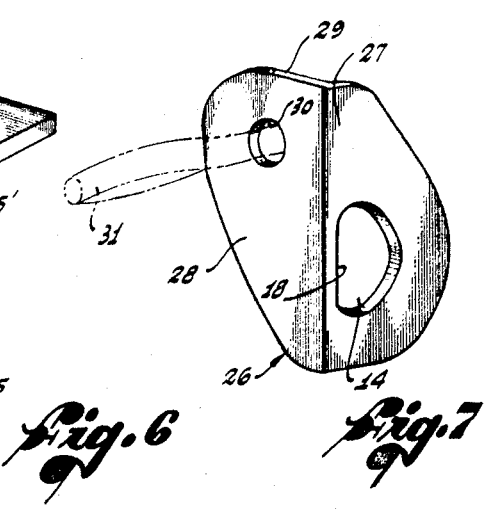
INVENTOR.
WILLIAM A. FEUERER
BY *Fulwider, Patton, Rieber,*
*Lee, and Utecht*
ATTORNEYS

United States Patent Office 3,467,351
Patented Sept. 16, 1969

3,467,351
ANCHORING DEVICE
William A. Feuerer, 2009½ Oak St.,
Santa Monica, Calif. 90405
Filed May 3, 1967, Ser. No. 635,718
Int. Cl. A44b 13/00
U.S. Cl. 248—216          8 Claims

ABSTRACT OF THE DISCLOSURE

An anchoring device having a shank or driven section for insertion into a supporting formation, and a head section attached to the driven section, the head section having an aperture with a generally D-shaped configuration, and capable of freely receiving a connecting member.

BACKGROUND OF THE INVENTION

Field of the invention

This invention is directed to anchoring devices that are required to resist twisting or bending loads. An example of such an anchoring device is a piton, which is a metal peg or stanchion to which a connector may be attached, and which is frequently used in mountain climbing.

Description of the prior art

The anchoring devices to which this invention is related comprise generally a shank or driven section and a head section which may, but need not be integral with the driven section. The driven section may take the form of a screw, bolt, blade, or thin wedge. It is inserted into a supporting formation, as by being driven into a crack in a large rock formation, with the head of the anchoring device against the rock formation. This leaves the head section extending outwardly from the supporting formation, and an aperture extends through the head to receive a suitable connecting means for supporting a weight or other load. The connecting means may comprise a rope, a snap ring, or other appropriate means.

It is important that the aperture be of a size sufficient to accommodate the connecting means so that no binding occurs, and preferably such that the connecting means may be easily and quickly inserted through the aperture. This means that the aperture must be materially larger than the connector, while not unduly increasing the size of the anchoring means. Furthermore, the aperture must be positioned so that the portion of the head between the aperture and the edge of the head is of a sufficient size to provide ample strength for the intended load. It will be appreciated, of course, that when any load is applied other than along the axis of the shank or driven portion, a certain bending or twisting force is applied. Most commonly, this force is directed generally perpendicular to the axis of the shank, and it is very desirable to keep the bending or twisting forces to a minimum. The perpendicular distance between the support and the line along which the load acts is the lever arm, and the torque, or bending force, is equal to the load multiplied by the lever arm. The lever arm represents the one variable that can be controlled when a given load is to be supported.

Prior anchoring devices have generally used head sections having a circular aperture or eye, and when a snap ring or other connecting means is inserted in the eye, the ring will seek a position vertically below the center of the eye. Since the eye is materially larger than the ring, this means that the ring is not so close to the supporting formation as it could be, and hence the torque or twisting moment is greater than it need be. Mountain climbers rely on pitons and similar devices to the extent of entrusting their lives to the strength of such anchoring means. Consequently, it is of utmost importance that the greatest possible strength and reliability be provided.

SUMMARY

The improved anchoring device of the present invention is designed to ensure that the connecting means, whether it be a snap ring, rope, or other device, will automatically take a position as close to the supporting means as possible, thereby insuring that the lever arm of the load is reduced to a minimum. This is accomplished by providing the head of the anchoring means with a specially shaped aperture positioned at a minimum distance from the appropriate edge of the head. For convenience, the edge or face of the head adjacent the supporting structure may be considered as the abutting face, and the opposite face, remote from the abutting face, may be considered as the exposed face of the head. The aperture or eye has the general shape of the letter D, with the straight side of the D substantially perpendicular to the axis of the shank, and with that side as close as possible to the abutting face. Consideration must be given, of course, to the provision of sufficient material between the straight side of the aperture and the abutting face to provide sufficient strength for the loads to be supported. The portion of the head between the abutting face and the straight side of the aperture might be considered as a columnar section having a minimum thickness in a direction parallel to the axis of the shank of the anchoring means, while still providing an ample margin of safety for any expected load.

FIGURE DESCRIPTION

FIGURE 1 is a perspective view of a piton provided with an aperture having the unique D configuration described herein.

FIGURES 2, 3 and 4 are fragmentary views of a piton provided with the novel aperture configuration of this invention, and illustrating the movement of a connector within the aperture as a body falls from a position above the piton to a position below the piton.

FIGURE 5 is a partial view of a piton provided with two apertures having the novel D configuration described herein.

FIGURE 6 is a perspective view of a piton inserted into a crack in a supporting formation in the "upside-down" position, illustrating the versatility provided by an aperture having the novel D configuration of this invention.

FIGURE 7 is a perspective view of a bolt hanger provided with an aperture having the novel D configuration of this invention, and showing in dotted outline a bolt for anchoring the hanger to a supporting formation.

FIGURE 8 is a plan view of a piton provided with an aperture having the novel D configuration, inserted into an overhead crack in a supporting formation and supporting a vertically depending load.

DESCRIPTION OF PREFERRED FORM

While the improvements of the present invention may be incorporated in a wide variety of anchoring devices, as will become apparent, the invention will first be described in connection with the piton shown in FIGURE 1 in which the numeral 10 designates a piton positioned or anchored in a formation 11. The piton 10 comprises a blade section 12 and a head section 13 having an aperture or "eye" 14 through which a ring or other connecting member may be passed. The blade 12, which may be of any desired length, (e.g., from one to five inches) is gently tapered from the head section 13 to the free end of the blade. The head section 13 includes a pair of web sections 15 and 16, with web 15 being a planar extension of the blade 12 and web 16 extending perpendicularly from web 15 along the length of the latter. The edge of the web 16 adjacent the blade 12 and perpendicular to the latter forms the abutting face 17 of the head section 13.

Preferably, the piton 10 is formed from a single piece of metal whether head section 13 is formed by bending a piece of metal relative to the blade 12 (FIGURE 5) or by forging (FIGURE 1). The metal from which the piton 10 is formed may be any metal which is nonbrittle and which has a high rigidity for its cross-section and weight. For example, the piton metal may be a chrome-molybdenum steel alloy, such as 4330 (modified). Certain aluminum alloys are also highly satisfactory for some applications.

Formed in the web 16 is an eye 14 defined by a leading edge 18 substantially perpendicular to the axis of the blade 12 and an arcuate rear edge 19 extending rearwardly from the leading edge. The straight or leading edge 18 is substantially parallel to the the abutting face 17 and this relationship provides a minimum and uniform cross-section of the forward columnar section 20 of the head 13. As a result, a connector may be displaced the minimum distance from the formation 11 and thereby minimize the torque applied to the piton 10 by a particular load.

The arcuate edge 19 is a complex curve comprising subarcs 21, 21', and 22. The subarcs 21, 21' are arcs of relatively small circles which are tangential to the ends of the straight edge 18 and thus help to reduce stress concentrations in the metal around the eye. The centrally located subarc 22 also forms an arc of a relatively small circle, preferably having the same diameter as the circles of which subarcs 21 and 21'; form a segment. Additional curved sections 23, 23' may be employed to join the subarcs 21 and 22 and 21' and 22, respectively, so that a connector 32 (FIGURES 2, 3 and 4) may slide without interference from a position adjacent the subarc 22 into contacting relation with the subarc 21 or 21'.

The subarcs 21, 21' and 22 need not be arcs of the same diameter circle, that is, each may be an arc of a circle of different diameter. However, to provide the least torque on the piton 10 at any given load, the curved sections 21, 21' should be arcs of a circle substantially equal to that of a connecting member 32. When this relationship between the connecting member 32 and the curved sections 21, 21' is maintained, the surface of the connector will be parallel to the curved section 21 or 21' and tangential to the straight edge 18 with the connector as close as possible to the straight edge. Such positioning of the loaded connector 32 ensures that the torque on the piton will be minimal for any particular load. Additionally, when a downward force is applied to the connecting member 32, it will easily slide into and remain firmly in the curved section 21 or 21' thereby reducing bouncing of the connecting member about the interior of the eye 14.

A typical D eye configuration for use with a connector 32 formed of an approximately 7/16 in. rod material has the folowing dimensions and proportions: total height of eye ($h$, FIGURE 2), 3/4 in.; total width of eye ($w$, FIGURE 2), from straight edge to furthest point on arcuate edge 9/16 in. to 19/32 in.; thickness of web 16, 1/8 in.; and radius of curved sections 21, 21' and 22, 7/32 in. In general, the total height of the eye and the total width of the eye will be about 1.7 and about 1.3 times, respectively, the diameter of a connector 32 used in combination with the piton.

The utility of the D eye configuration will become more evident from the following description of its operation in combination with a connector 32. In FIGURES 2, 3 and 4, the numeral 10 designates a piton having an eye 14 with the D configuration through which a connector 32 is snapped. Where a climber (not shown) is climbing above a piton, the connector 32 will be extended upwardly as shown in FIGURE 2. If the climber falls, the connector 32 will rotate and move downwardly as shown by the path 33. Because of the unique design of the eye 14, the connector 32 will be forced into a substantially abutting position against the leading or straight edge 18 of the eye 14 (FIGURE 4) when the climber has fallen below the piton 10. This result is produced even though a component of the force along the plane of the connector 32 tends to pull the connector outwardly away from the formation 11.

The final, substantially abutting position of the connector 32 against the straight edge 18 results from a combination of: (a) the downwardly and forwardly slope of the curved sections 22 and 21, which tend to force the downwardly moving connector 32 forwardly toward the straight edge 18; and (b) the unique shape of the curved section 21 which brings the connector 32 to rest at the closest possible point to the formation 11 consistent with maximum piton strength. The combination of these factors minimizes the torque on the piton 10, producing substantailly lower torques than prior art pitons.

The D eye design also ensures that the connector 32 will alway move downwardly to the same position adjacent the straight edge 18 of the piton 10. This means that, for any particular load, the resulting torque will always be substantially the same. Thus, the load-holding capabilities of a piton employing the D eye configuration will be highly predictable, thereby increasing the safety provided to a climber by pitons.

Pitons employing the D eye configuration may also be used in an "upside-down" position, that is, with the web 16 extending upwardly from a generally horizontal blade, with substantially the same improved holding strength as when used right-side up. Use of a piton in the "upside-down" position is shown in FIGURE 6 wherein the piton 10 is inserted into a generally horizontal crack defined by an upper lip 24 and a lower lip 25 extending outwardly beyond the upper lip.

Because of the generally symmetrical shape of the D eye 14, the loaded connector 22 comes to rest with its circumference substantially tangential to the straight edge 16 and substantially parallel to the curved section 19 which is at the top of the eye 14 in the piton position shown in FIGURE 6. All the advantages previously described in connection with the use of a D eye piton in the "right-side up" position (FIGURE 1) are provided by the use of a D eye configuration in combination with an "upside-down" piton. Therefore, the flexibility of a piton having the D eye configuration is greatly increased, that is, a single D eye piton may be used, with the same advantages, in both the "right-side up" and "upside-down" positions.

In locations where the substantially vertical face of a rock may have both vertically and horizontally extending cracks, the form of piton shown in FIGURE 5 may be particularly useful. In this form, the head 13' is formed by bending an extension of the web 15' to form the web 16'. An eye 14 is formed in both web 15 and web 16', preferably with their straight edges 18 in substantial alinement. When a vertically extending crack is encountered, the eye in the web 15' may be used, and when a horizontally extending crack is encountered, the eye in the web 16' may be used.

Pitons having the D-shaped aperture may also be used to advantage in overhead cracks as shown in FIGURE 8. When a piton 10 is in this position, the connector 32 extends downwardly from a position in the aperture 14 approximately equidistant from the ends of the straight or leading edge 18. Loads acting downwardly on the connector 32 cause a twisting force to be placed on the piton because of the horizontal displacement of such loads from a vertical plane extending along the longitudinal axis of the blade 12. This twisting force increases the holding power of the piton 10 by tending to cock the blade 12 which causes the blade to more firmly wedge in the vertical crack.

From the foregoing, it will be understood that when the anchoring devices of this invention are driven into horizontal cracks (whether right-side up or upside-down as previously described), the unique configuration and positioning of the D aperture or eye minimizes the torque applied by a particular load to the anchoring device. Furthermore, when such anchoring devices are employed in overhead cracks as shown in FIGURE 8, the D configuration of the aperture permits twisting forces to be applied to the anchoring device to more firmly wedge such devices in a supporting formation. Thus, the D configuration of the aperture either minimizes or increases the twisting force on an anchoring device depending upon whether it is desirable to minimize or increase, respectively, such twisting forces.

The anchoring devices described thus far have comprised devices in which the head section is integral with the blade or driven section. However, the advantages derived from the D eye configuration are also obtainable with anchoring devices which comprise separable driven and head sections. An example of such an anchoring device is the bolt hanger shown in FIGURE 7. In FIGURE 7, the numeral 26 designates a bolt hanger having two generally perpendicular flanges 27, 28. An aperture 14 having the previously described D configuration is positioned in one flange 27 preferably by locating the straight or leading edge 16 of the aperture at the juncture of the flange 27 and of the trailing or rear face 29 of the other or abutting flange 28. A second aperture 30 is located in the abutting flange 28 and is sized to receive a bolt 31 (shown in dotted outline). The bolt 31 may have other configurations in addition to that shown in FIGURE 7. The bolt 31 is driven into a supporting formation until the abutting flange 28 is firmly pressed against the supporting formation. The operation of a bolt hanger in other respects is the same as the previously described operation of a piton.

The D eye configuration can be used in combination with pitons of varying shapes and sizes. Examples of such pitons are double-apertured pitons such as that shown in FIGURE 5, pitons having the head extending from the center of the blade (FIGURE 1) and pitons such as that of FIGURE 5 wherein the head extends from an edge of the blade. In this connection, the piton may be modified by narrowing the web 15 near the head to better accommodate a connector as shown for example in FIGURES 1 and 6.

From the foregoing, it will be evident that I have invented anchoring devices having apertures which are positioned at particular locations in such anchoring devices and which have a new and unique configuration. The novel aperture or eye configuration of this invention ensures that minimal torque at any particular load is applied to the anchoring devices of this invention, thereby providing a much safer anchoring device than is presently available. Additionally, at a given load, the torque of an anchoring device having an aperture with the described D configuration will be substantially the same each time that load is applied to the anchoring device because the arcuate edge of the aperture will always urge a connecting means into the same abutting position with the straight edge of the aperture.

I claim:
1. An anchoring device of the type intended to be driven into a rock-like supporting formation, and to receive a ring-like connector of a generally predetermined size, the device including:
 a driven section for insertion into a supporting formation;
 and a head section attached to the outer end of said driven section and including a web having a noncircular aperture therein of sufficient size to freely accept a ring-like movable connector extending therethrough, said aperture being defined by a leading edge near said driven section and an arcuate edge extending generally away from said driven section, said leading edge being substantially straight and substantially perpendicular to the longitudinal axis of said driven section, and said arcuate edge being connected to said leading edge by subarcs having a radius not substantially greater than the radius of said connector, whereby said connector is urged into abutting position with said leading edge of said aperture.

2. The anchoring device of claim 1 wherein said subarcs have equal radii.

3. The anchoring device of claim 1 wherein the height of said aperture is about 1.7 times the diameter of said connector and the width of said aperture is about 1.3 times the diameter of said connector.

4. An anchoring device of the type intended to be driven into a rock-like supporting formation, and to receive a ring-like connector of a generally predetermined size, the device including:
 a driven section having a thinner end for insertion into a supporting formation;
 and a head section attached to the end of said driven section opposite said thinner end, said head section comprising a first web substantially coplanar with said driven section, and a second web substantially perpendicular to said driven section and said first web, said second web having an abutting face for bearing against said supporting formation and having a noncircular aperture of sufficient size to freely receive a ring-like movable connector, said aperture being defined by a substantially straight edge generally parallel to and spaced a minimum distance from said abutting face and by an arcuate edge connected to the ends of said straight edge by subarcs tangent to said straight edge, at least one of said subarcs having a radius not substantially greater than the radius of said connector, whereby said connector is urged into abutting position with said straight edge of said aperture.

5. The anchoring device of claim 4 wherein said first web has an aperture therein of substantially the same shape as said aperture in said second web, said straight edge of said aperture in said second web being substantially coplanar with the straight edge of said aperture in said first web.

6. The anchoring device of claim 4 wherein said subarcs have a radius substantially equal to said radius of said connector, said subarcs extending substantially parallel to a substantial portion of the circumference of said connector when said connector abuts said straight edge of said aperture.

7. The anchoring device of claim 4 wherein said device is a piton.

8. The anchoring device of claim 4 wherein said abutting face of said second web and said straight edge of said aperture define a columnar section of said second web having sufficient strength to withstand forces to which said columnar section may be subjected.

References Cited

UNITED STATES PATENTS

| 1,905,966 | 4/1933 | Milne et al. | 24—115 X |
| 2,576,355 | 11/1951 | Parmesan | 248—216 X |
| 3,255,505 | 6/1966 | Moser | 24—205.14 |

FOREIGN PATENTS 967,270   3/1950   France.

ROY D. FRAZIER, Primary Examiner

J. FRANKLIN FOSS, Assistant Examiner

U.S. Cl. X.R.

24—73, 115